United States Patent [19]
Sakurai et al.

[11] Patent Number: 5,160,214
[45] Date of Patent: Nov. 3, 1992

[54] IRRIGATION SYSTEM AND IRRIGATION METHOD

[76] Inventors: Mikio Sakurai; Chikako Sakurai, both of 2274-38 Senba-cho, Mito-shi, Ibaraki, Japan

[21] Appl. No.: 644,773

[22] Filed: Jan. 23, 1991

[30] Foreign Application Priority Data

Jan. 23, 1990 [JP] Japan .................. 2-14609

[51] Int. Cl.$^5$ .......................................... F02B 11/00
[52] U.S. Cl. .................................. 405/36; 405/52; 405/37
[58] Field of Search ............... 405/52, 53, 43, 73, 405/74, 36, 37–42, 46–49; 210/170

[56] References Cited

U.S. PATENT DOCUMENTS

| | | | |
|---|---|---|---|
| 3,289,415 | 12/1966 | Merrill | 405/52 X |
| 4,122,012 | 10/1978 | Vlasnik | 405/52 X |
| 4,335,977 | 6/1982 | Ihli | 405/52 |
| 4,449,849 | 5/1984 | Horn et al. | 405/52 |
| 4,452,548 | 6/1984 | Balogh et al. | 405/52 |
| 4,455,226 | 6/1984 | Lahav | 405/52 X |
| 4,735,524 | 4/1988 | Dunkers | 405/52 X |
| 4,762,276 | 8/1988 | Foust | 405/52 X |

FOREIGN PATENT DOCUMENTS

| | | |
|---|---|---|
| 3501396 | 7/1986 | Fed. Rep. of Germany . |
| 57-150328 | 9/1982 | Japan . |
| 57-186422 | 11/1982 | Japan . |

OTHER PUBLICATIONS

"Artificial Lake Plan for Improving Desert Environment", J. Japan Society of Hydrology and Water Resources, vol. 2, No. 2, 1989, pp. 7–9.
"Desert Aqua-Net", Shimizu Bulletin, vol. 57, Sep. 1988, pp. 14–18.
"Sahel Green Belt Plan", First Symposium on Current Status and Issues on Revegetation Study, The Japanese Society of Revegetation Technology, Nov. 1989, pp. 24–26.

Primary Examiner—Dennis L. Taylor
Attorney, Agent, or Firm—Lowe, Price, LeBlanc & Becker

[57] ABSTRACT

An irrigation system comprises a pump facility 11 for pumping up seawater from the sea, an artificial seawater lake 31 formed in an inland area, a freshwater producing plant 41 for producing freshwater from seawater, an artificial freshwater lake 51, and an irrigation canal 61 for supplying the freshwater to a projected irrigation area. A solar-cell power generation plant 21-25 is constructed for supplying electric power to operate the irrigation system. The irrigation including the artificial seawater lake is formed in an inland area in a comparatively short time, and freshwater is produced from the seawater stored in the artificial seawater lake. Therefore freshwater can be supplied to a projected irrigation area at an early stage of the construction of the irrigation system.

10 Claims, 7 Drawing Sheets

IRRIGATION SYSTEM AND IRRIGATION METHOD

BACKGROUND OF THE INVENTION

1. Field of the Invention

The present invention relates to an irrigation system and an irrigation method for producing freshwater from seawater and supplying the freshwater to inland area.

2. Description of the Prior Art

A method of irrigating an inland area including a desert was proposed by a German named Hermann Seger in 1935, referred to as a Plan of the African Central Artificial Lakes. This plan has the steps of: damming up the Zaire River at a concave area to make a large scale artificial lake, introducing the water of the artificial lake into Lake Chad in the desert, and further introducing the water into Algeria and Tunisia at the north coast of Africa to flow out into the Mediterranean Sea.

According to the above plan, however, a huge amount of freshwater is initially required to make an artificial freshwater lake, and it takes an enormous time to produce the freshwater. Thus the plan is hard to realize.

SUMMARY OF THE INVENTION

An object of the present invention is to provide an irrigation system and an irrigation method for forming a water supply system in an inland area within a comparatively short time and for supplying freshwater to a projected irrigation area.

The present invention is directed to an irrigation system comprising:

a pump facility for pumping up seawater from an ocean;

an artificial seawater lake formed in an inland area for storing the seawater pumped up by the pump facility;

a freshwater producing facility for pumping up the seawater from the artificial seawater lake and for producing freshwater from the seawater; and a freshwater supply facility for supplying the freshwater produced by the freshwater producing facility to a projected irrigation area.

The present invention is also directed to an irrigation method comprising the steps of:

(a) constructing a pump facility for pumping up seawater from an ocean;

(b) forming an artificial seawater lake in an inland area for storing the seawater pumped up by the pump facility;

(c) constructing a freshwater producing facility for pumping up the seawater from the artificial seawater lake and for producing freshwater from the seawater; and (d) constructing a freshwater supply facility for supplying the freshwater produced by the freshwater producing facility to a projected irrigation area.

These and other objects, features, aspects and advantages of the present invention will become more apparent from the following detailed description of the present invention when taken in conjunction with the accompanying drawings.

BRIEF DESCRIPTION OF THE DRAWINGS

In the accompanying drawings

DESCRIPTION OF THE PREFERRED EMBODIMENT

Figure 1:
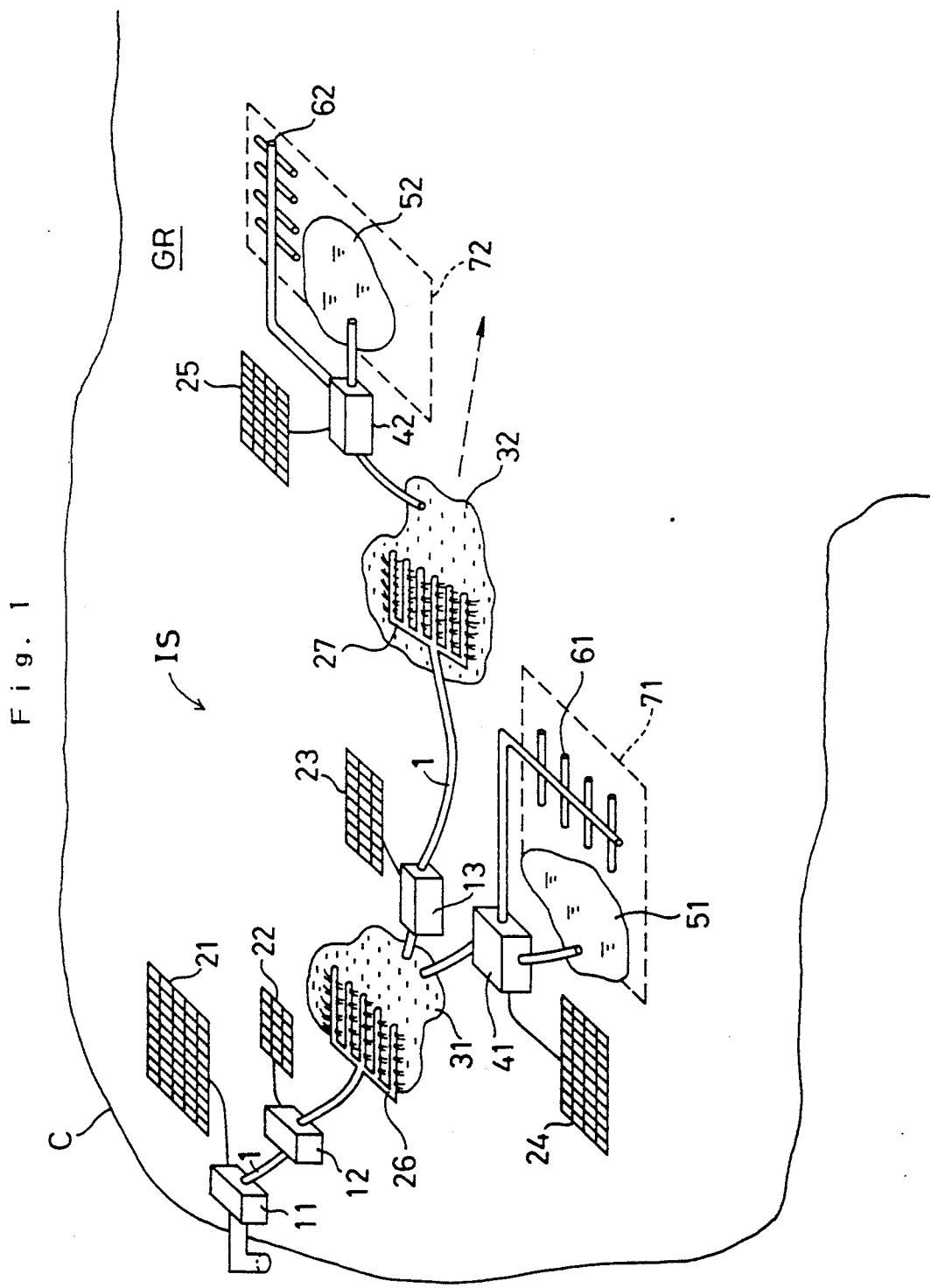
FIG. 1 schematically illustrates an irrigation system embodying the present invention.

FIG. 1 is a schematic view of an irrigation system embodying the present invention. The irrigation system IS is laid out in an area ranging from a coastal part C of a land GR to its inland part.

The seawater is pumped up by a pump facility 11 installed at the coastal part C, and supplied to an relay pump facility 12 via a pipeline 1. The seawater is further supplied to a first artificial seawater lake 31 to be stored therein. At the end of the pipeline 1 in the seawater lake 31 is provided a seawater spray facility 26 described later in detail for spraying the seawater in the lake 31.

There are constructed preferably two solar-cell power generation plants 21 and 22 for respectively supplying electric power to the pump facilities 11 and 12.

The artificial seawater lake 31 may be conveniently formed, as an element of the irrigation system IS, by damming up a part of a concave area in the land GR. This is also the case with other artificial seawater lakes and artificial freshwater lakes described later.

In the vicinity of artificial seawater lake 3, the seawater may ooze out from the lake to make the underground water salty. Therefore the artificial seawater lake is preferably formed on concave bedrock to prevent leakage of salty underground water.

Another pump facility 13 is further installed in the vicinity of the first artificial seawater lake 31. The seawater is pumped up by the pump facility 13 and supplied to a second artificial seawater lake 32 via the pipeline 1. At the end of the pipeline 1 in the lake 32 is provided a seawater spray system 27 in the same manner as in the first artificial seawater lake 31. Electric power of the pump facility 13 is supplied from another solar-cell power generation plant 23.

Many artificial seawater lakes can be formed in the same manner; that is, by serially making a pump facility and an artificial seawater lake.

When one artificial seawater lake is made, irrigation facilities can be established as follows. In the vicinity of the first artificial seawater lake 31, a freshwater producing plant 41 and a solar-cell power generation plant 24 are constructed. The power generation plant 24 supplies electric power to the freshwater producing plant 41.

The seawater pumped up from the first artificial lake 31 is changed into freshwater in the freshwater producing plant 41. The freshwater thus produced is stored in a first artificial freshwater lake 51, and is also supplied to a revegetation area 71 via an irrigation canal 61 which is constructed as a freshwater supply facility. Such a "revegetation area" is an area which is (or was)

a sandy place or a wasteland, and in which arable land, meadowland, forest or the like is to be formed by irrigation.

In the vicinity of the second artificial seawater lake 32 are constructed a freshwater producing plant 42, a solar-cell power generation plant 25, a second artificial freshwater lake 52, and an irrigation canal 62 in the same manner as in the vicinity of the first artificial seawater lake 31.

Figure 2:
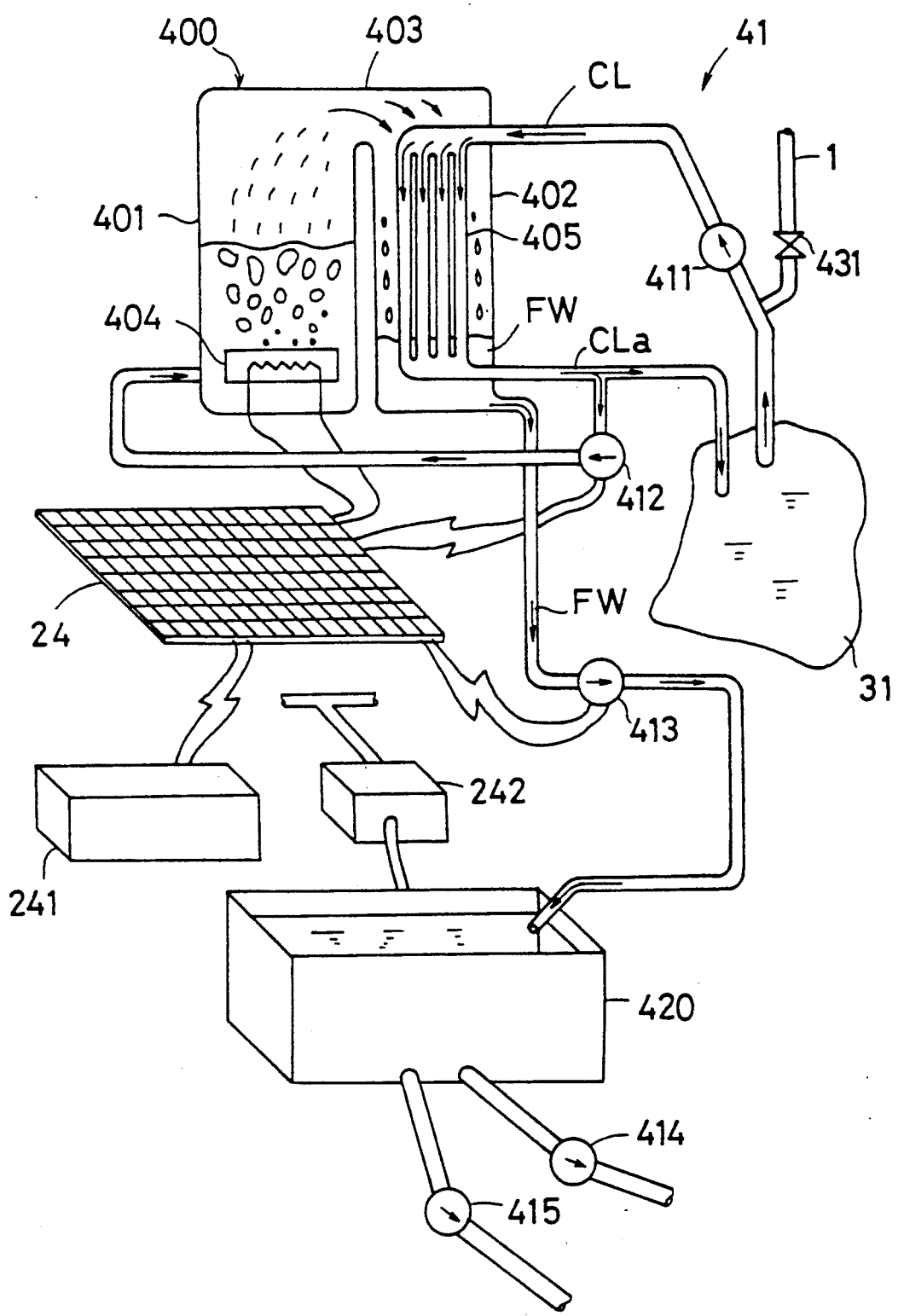
FIG. 2 schematically illustrates a freshwater producing facility and its peripheral facilities.

FIG. 2 is a schematic view showing the freshwater producing plant 41 and its peripheral facilities. The freshwater producing plant 41 comprises a distillation apparatus 400, pumps 411-415, and a freshwater tank 420. The distillation apparatus 400 is divided into a seawater vaporization vessel 401 and a steam condensation vessel 402. These vessels 401 and 402 are connected to each other by a connection part 403 having a relatively small flow passage area. The seawater vaporization vessel 401 includes a heater 404 at its bottom.

The seawater is supplied into the seawater vaporization vessel 401, and is vaporized by the heater 404. The fresh water vapor or steam thus produced is introduced into the condensation vessel 402 via the connection part 403. In the condensation vessel 402 is provided heat exchange piping 405 having a plurality of vertical pipes.

The pump 411 pumps up the seawater from the artificial lake 31, and supplies the same to the heat exchange piping 405. The seawater flows in the heat exchange piping 405 as coolant CL. Since the heat exchange piping 405 is cooled by the coolant CL, fresh water vapor is condensed at the outside of the heat exchange piping 405 to become freshwater FW. A portion of the coolant CLa flowing out from the heat exchange piping 405 is returned to the artificial seawater lake 31, and another portion is supplied into the seawater vaporization vessel 401 as feedwater by the pump 412. The coolant CL flowing out from the heat exchange piping 405 is warmed up as a result of the receiving heat from condensation of the fresh water vapor. The use of the warmed-up coolant CLa as the feedwater to the seawater vaporization vessel 401 provides an advantage of increasing energy efficiency of the freshwater production.

Since a part of the warmed-up coolant CLa is returned to the artificial seawater lake 31, the temperature of the lake 31 rises accordingly. The rising lake temperature increases the vaporization from the seawater lake 31, thereby increasing the total amount of the freshwater in the environment of this area. The rising lake temperature, however, also increases the temperature of the coolant CL to be supplied to the freshwater producing plant 400. If the lake temperature is raised too much, the efficiency of steam condensation in the steam condensation vessel 402 is lowered; hence it becomes difficult to effectively obtain a large amount of freshwater. In order to prevent this problem, a valve 431 is provided between the pipeline 1 and a branch of a pipe between the pump 411 and the lake 31; the valve 431 is opened to feed relatively cool seawater from the pipeline 1 to the heat exchange piping 405 as the coolant CL when the lake temperature is more than a predetermined value.

The freshwater FW in the steam condensation vessel 402 is fed to a freshwater tank 420 by a feed pump 413 to be stored therein. The freshwater is supplied to the revegetation area 71 (FIG. 1) by irrigation pumps 414 and 415.

The freshwater FW can be stored only in the freshwater tank 420 if the capacity of the freshwater producing plant is small. On the other hand, if the capacity of the freshwater producing plant becomes fairly large, the artificial freshwater lake 51 (FIG. 1) is formed in addition to the freshwater tank 420. The artificial freshwater lake 51 facilitates the revegetation of far larger area.

Electric power of the pumps 411-415 and the heater 404 is supplied from the solar-cell power generation plant 24. Use of the electric power generated with solar cells provides an advantage of preventing additional heat to that given to this area naturally.

Figure 3:
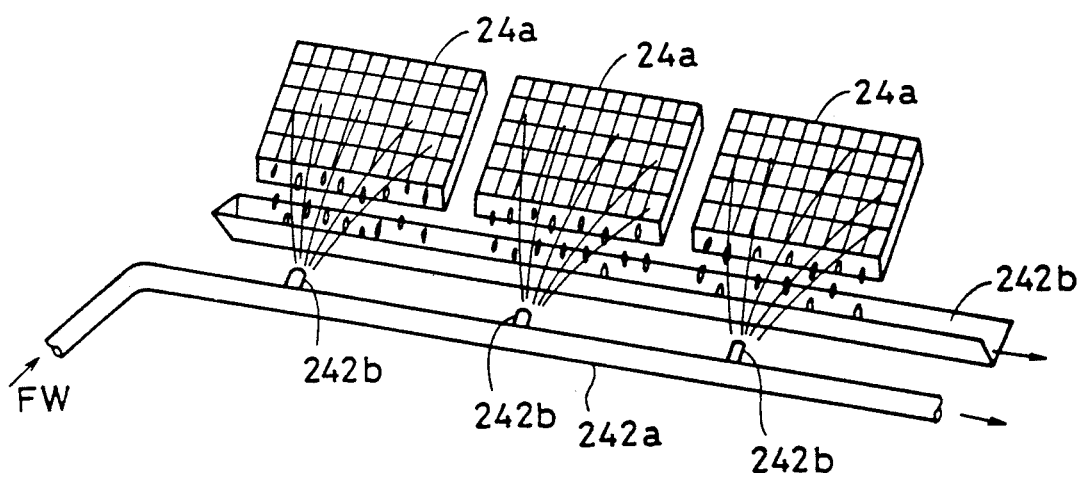
FIG. 3 schematically illustrates a sprinkler facility for cleaning solar cells.

The solar-cell power generation plant 24 is provided with a sprinkler facility 242 for cleaning exposed surfaces of the solar cells, thereby preventing reduction of power generation efficiency. The sprinkler facility 242 periodically sprays freshwater, which is supplied from the freshwater tank 420, on the surfaces of the solar cells to maintain the surfaces clean. FIG. 3 is a perspective view showing the sprinkler facility 242 cleaning the solar cell surfaces. The sprinkler facility comprises a feedwater pipe 242a and spray nozzles 242b connected to the feedwater pipe 242a for spraying freshwater on solar cell units 24a. The freshwater FW is supplied from the freshwater tank 420 to the spray nozzles 242b through the feedwater pipe 242a, sprayed on the surfaces of the solar cell units 24a to clean the surfaces, and collected by a gutter 242b to be returned to the freshwater tank 420 (or to the freshwater lake 51). Incidentally, the sprinkler facility may be so constructed that it can utilize seawater as backup feedwater. When seawater is used as the feedwater, the drainage is returned to the seawater lake.

Since solar cells cannot generate electric power at night, a large scale battery plant 241 is provided adjacent to the solar-cell power generation plant 24. Batteries of the plant 241 are charged up in the daytime, and discharge electricity at night, whereby the pumps 411-415 and the heater 404 can operate at night. The installation of the battery plant 241 can reduce the capacity of the freshwater producing plant 41 to produce a predetermined amount of freshwater because the battery plant 241 can operate the freshwater producing plant 41 day and night.

According to the above embodiment, a large amount of seawater is initially transported to an inland area to form artificial seawater lakes 31 and 32, and freshwater is then produced with the seawater of the artificial seawater lakes 31 and 32; this facilitates the use of a large amount of water in the inland area at an early stage of the construction of the irrigation system. The seawater lakes are easier to form than freshwater lakes, with smaller amount of energy consumption. This makes it easier to produce freshwater and provide the same to the revegetation area.

In the above embodiment, the warm drainage CLa of the coolant CL used for steam condensation is returned to the seawater lake 31, thereby warming the lake. The lake temperature rising increases vaporization from the surface of the seawater lake. Consequently, the air is humidified, and the total amount of freshwater in that area is increased; thus more rainfall is expected in that area. This means that the warm drainage CLa contributes to the increase of the total amount of freshwater in the area. Therefore the whole energy generated in the solar-cell power generation plant is utilized to increase freshwater, and the energy efficiency is maintained considerably high in this system.

Although a sandy place or a wasteland is exploited as a revegetation area in the above embodiment, the present invention is applicable to revegetation of a desert. In revegetating a desert, artificial freshwater lakes are preferably formed in areas such as a wadi (or a dry river bed) or a dry lake bed to make use of the natural local water system in the desert as much as possible.

The sprinkler facility 242 is useful especially in irrigating a desert because the solar cell surfaces are easily soiled because of a sandstorm.

As described before, The vapor from the artificial seawater lakes 31 and 32 humidifies the air to increase the total amount of freshwater in that area, and thereby more rainfall is expected in that area. This effect is expected to be large in case of irrigating desert land. On the other hand, it may take several months or even several years to transport enough seawater from ocean to an inland area to form the first artificial seawater lake 31. During this stage, however, it is preferable to promote the vaporization of seawater for the same reason stated above. For this purpose, an open canal (hereinafter referred to as "vaporization promoting canal") is effective which can be provided as a part of the pipeline 1.

Figure 4:
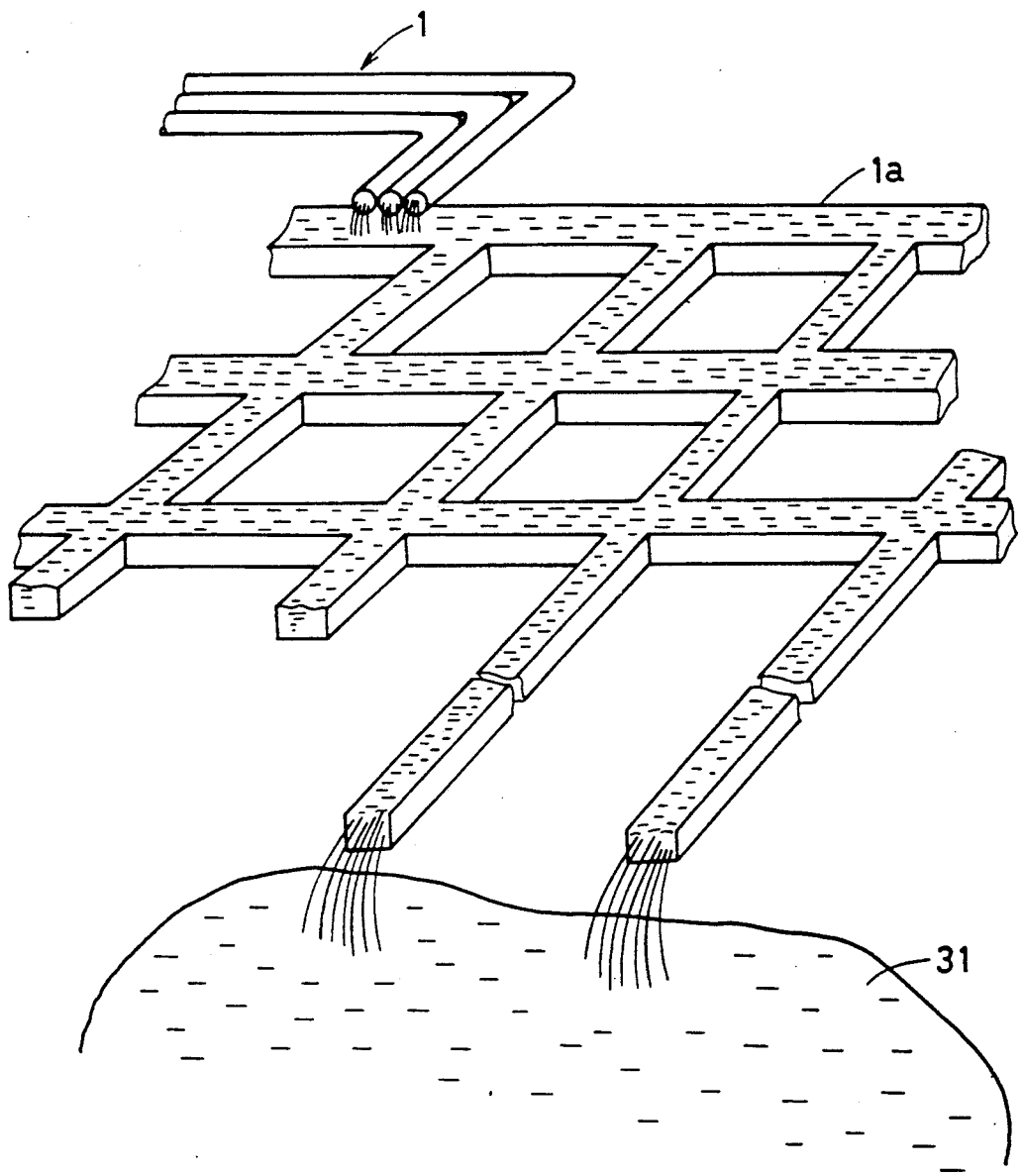
FIG. 4 schematically illustrates a vaporization promoting canal.

FIG. 4 is a schematic perspective view showing an example of the vaporization promoting canal. The vaporization promoting canal 1a is formed in a shape of a grid to provide a large total area of the upper surface. It is effective to construct the vaporization promoting canal 1a in a large area leading to the artificial seawater lake 31. Incidentally, the sides and the bottom of the vaporization promoting canal 1a are preferably made of watertight material such as concrete.

Figure 5:
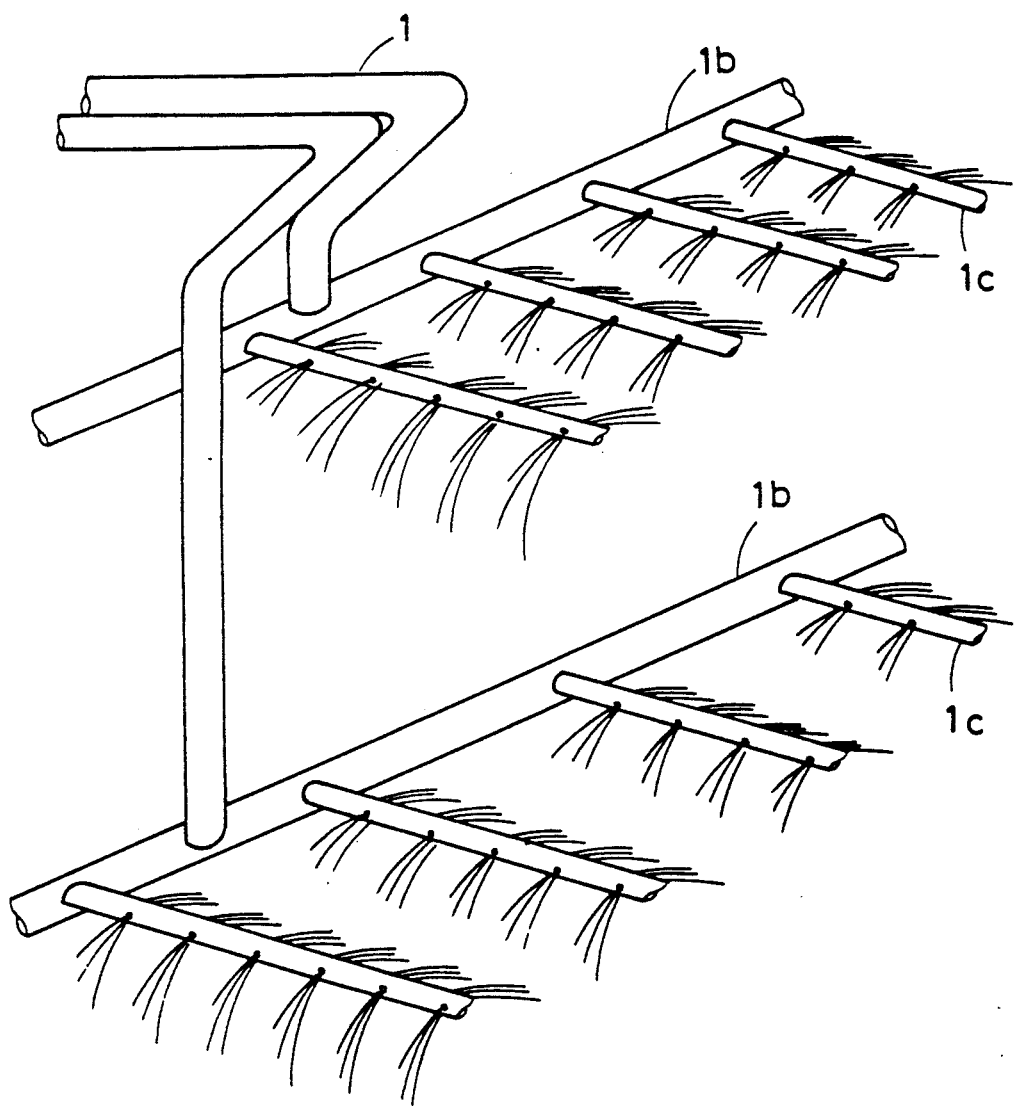
FIG. 5 schematically illustrates a vaporization promoting spray facility.

As another means for promoting vaporization of seawater before the first artificial seawater lake 31 is formed, the spray facility 26 (FIG. 1) is useful which is provided in a projected artificial-seawater-lake area where the artificial seawater lake is to be formed. FIG. 5 schematically illustrates the vaporization promoting spray facility 26. The vaporization promoting spray facility comprises horizontal large pipes 1b connected to the pipeline 1, and horizontal small pipes 1c connected to the large pipes 1b. The small pipes 1c have plural holes at their sides, from which seawater is sprayed on the projected artificial-lake area. The sprayed seawater vaporizes rapidly because of the hot ground of the desert, the sunshine and hot winds. The vapor humidifies the air to rapidly increase the total amount of freshwater in the desert area. The reasons why the vaporization promoting spray facility is formed in the projected artificial-seawater-lake area are because: salt made by the vaporization is soluble in the artificial seawater lake, and therefore no special treatment for the salt is required; and the area can be restricted where the seawater oozes out into the ground to make the underground water salty.

The above irrigation system for irrigating a desert provides an advantage of making use of a valueless desert area as large seawater lakes and large freshwater lakes while maintaining valuable plain. Incidentally, the inland seawater lake may affect the nature thereabout. However the inland seawater lake is not expected to cause a big problem because inland saltywater lakes such as the Caspian Sea or the Aral Sea actually exist in the world, and the vicinity of these lakes is habitable. Even if there is some influence of the seawater lake, the merit obtained by the revegetation can be far greater than the influence because the area is initially a desert.

Table 1 shows an example of the typical specification of the desert irrigation system.

TABLE 1

| | | |
|---|---|---|
| SEAWATER FEED SYSTEM | | |
| (1) | seawater pump capacity | 30,000 m$^3$/Hr per plant (10,000 m$^3$/Hr × 3 pumps) |
| (2) | pipeline diameter | 1,600 mm$\phi$ × 3 |
| (3) | transport distance | 1,000 km (with five pump stages) |
| (4) | height difference | 500 m (ditto) |
| (5) | seawater pump head | 230 m × 5 stages |
| (6) | seawater pump motor power (7,500 kW × 3 pumps × 5 stages = 112,500 kW) | 7,500 kW per pump |
| (7) | power plants (5 stage total) | 120,000 kW |
| FRESHWATER PRODUCING PLANT | | |
| (11) | freshwater supply | 5,700 m$^3$/Hr |
| (12) | vaporization latent heat | 6.2 × 10$^8$ kcal/Hr (= 720 MW) |
| (13) | seawater pump capacity | 8,000 m$^3$/Hr (pump power = 500 kW) |
| (14) | seawater inlet/outlet temp. | 30° C./70° C. |
| (15) | feedwater pump capacity | 5,700 m$^3$/Hr (pump power = 200 kW) |
| (16) | freshwater transport pump capacity | 5,700 m$^3$/Hr (pump power = 300 kW) |
| (17) | solar cell power (for vaporization) (for pumps) | 720 MW 1,000 kW |
| REVEGETATION AREA | | |
| (21) | revegetation area | 50 km$^2$ (5 km × 10 km) |
| (22) | freshwater spray density (corresponding to 1000 mm of annual rainfall) | 1.0 × 10$^6$ m$^3$/km$^2$/yr |
| (23) | freshwater demand | 5.0 × 10$^7$ m$^3$/yr |
| (24) | freshwater supply | 5,700 m$^3$/Hr |

According to the above embodiment, since the first step of forming a water system is carried out with seawater, a large amount of water can be utilized even in the early stage of the construction of the irrigation system; on the other hand, in case of firstly forming a freshwater lake, a huge amount of time and energy would be necessary to produce freshwater itself in the early stage of the construction. Further, the large seawater lake may change the climate and thereby rainfall is expected to increase. Accordingly, the seawater lake serves the possibility that more freshwater can be obtained by rainfall before a freshwater producing plant is constructed. These effects of the artificial seawater lake enable to form an irrigation system with relatively small investment and to sequentially expand the irrigation area. If the irrigation area is expanded, the profit obtained by agriculture, forestry and stockbreeding in the irrigation area can provide further investment for the next expansion.

The large amount of salt produced by the freshwater production may be utilized as substituted material for earth and sand, which is used as dam fillers. Since a desert often has a rock salt layer, the accumulation of salt by the freshwater production may not greatly affect the nature of the desert, and therefore the irrigation system is suitable for a desert area.

Although freshwater is produced by distillation of seawater in the above embodiment, freshwater may be also produced by ion exchange.

Figure 6:
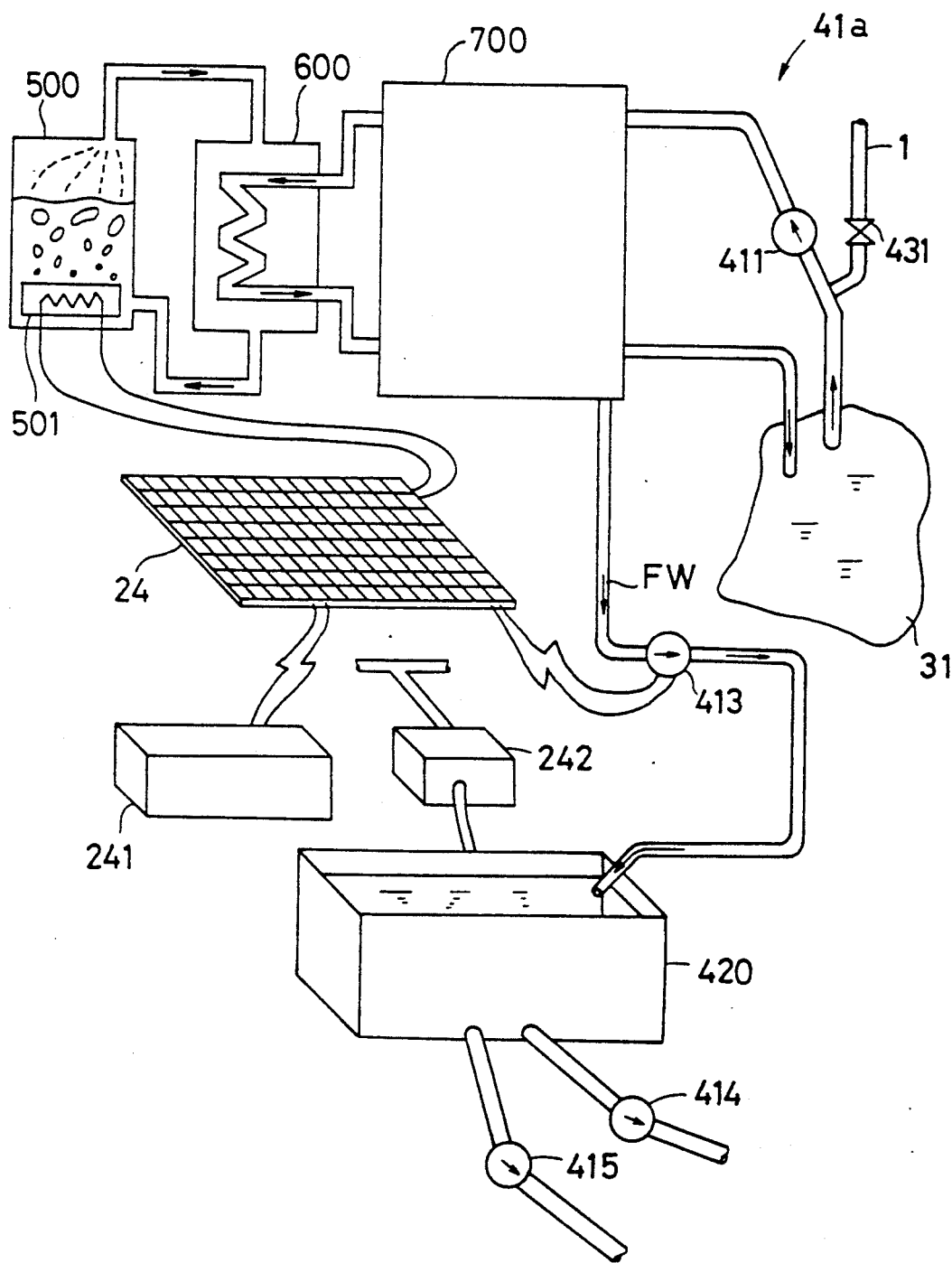
FIG. 6 schematically illustrates another type of the freshwater producing facility.

Alternatively, the freshwater producing plant 400 can be replaced by a multi-stage flash evaporation system. FIG. 6 is a view, corresponding to FIG. 2, showing the multi-stage flash evaporation system 41a and its peripheral facilities. The multi-stage flash evaporation system 41a comprises a steam generation vessel 500, a brine heater 600, and a multi-stage flash evaporator 700 as well as the pumps 411 and 413. The combination of the steam generation vessel 500, the brine heater 600, and the multi-stage flash evaporator 700 produces freshwater as the combination of the seawater vaporization vessel 401, the steam condensation vessel 402, and the feedwater pump 412 shown in FIG. 2 does, but in more efficient way.

The steam generation vessel 500 includes a heater 501, and generates steam to supply the same to the brine heater 600. The brine heater 600 is a heat exchanger to heat seawater or brine including seawater supplied from the flash evaporator 700.

Figure 7:
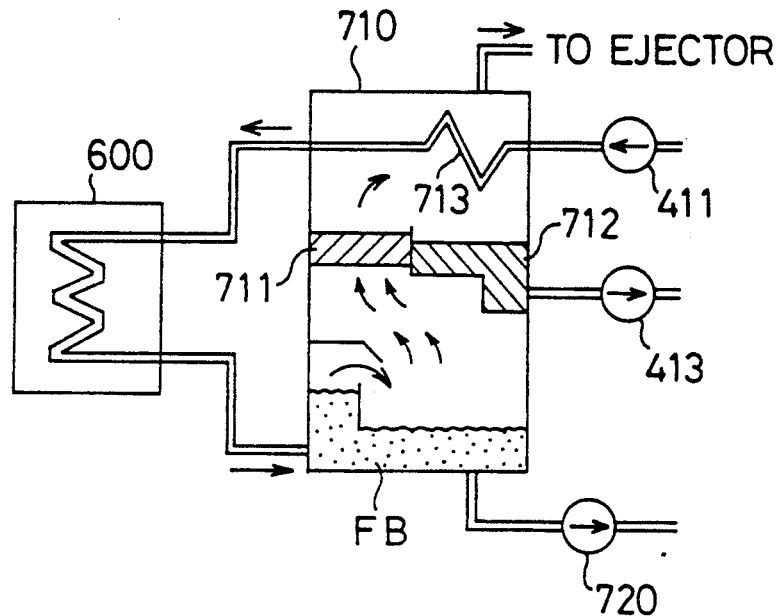
FIGS. 7 and 8 schematically illustrate a single-stage flash evaporator and a multi-stage flash evaporator, respectively.
Figure 8:
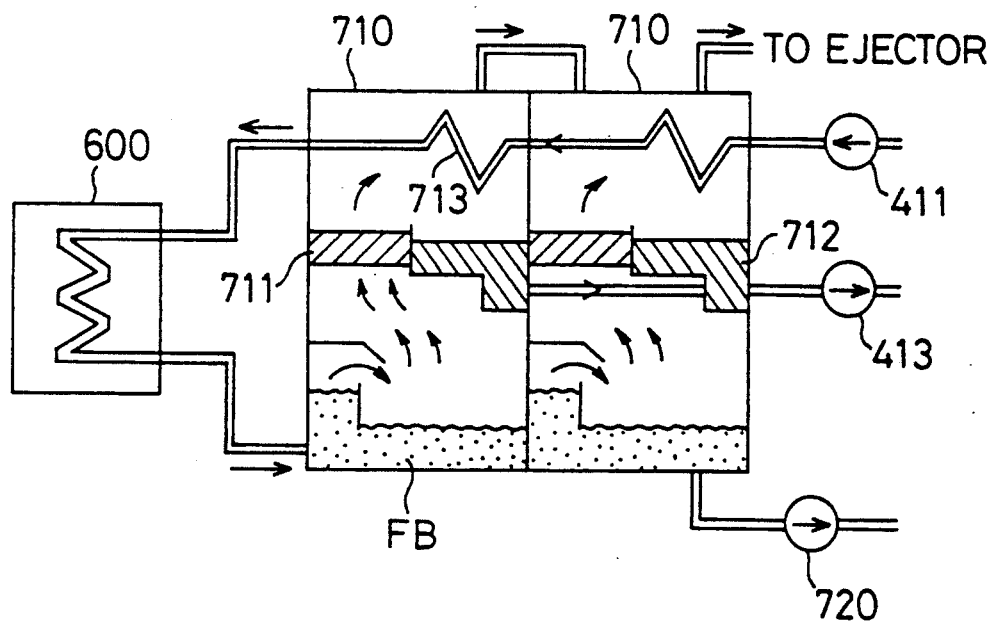

FIGS. 7 and 8 schematically illustrate the principle of a single-stage flash evaporator and that of a multi-stage flash evaporator, respectively. The principle of the flash evaporation is as follows: if seawater is introduced into a chamber in which the pressure is lower than the saturation pressure corresponding to the seawater temperature, self-evaporation, or flash evaporation, takes place at the moment the seawater enters the chamber. The steam produced by the flash evaporation of the seawater is condensed and taken out as freshwater.

The single-stage flash evaporator shown in FIG. 7 comprises a flash chamber 710, a demister 711, a condenser 712, condenser tube bundles 713 located in the upper part of the flash chamber 710, and a brine pump 720.

Brine is flashing at the bottom of the flash chamber 710 to produce flashed steam. Seawater as a coolant flows through the condenser tube bundles 713 to be preheated by the flashed steam; this in turn makes the flashed steam condense to be a distillate.

The preheated seawater is further heated by external heating steam in the brine heater 600, and then flows into the flashing brine at the bottom of the flash chamber 710, in which the flash evaporation of the seawater takes place instantaneously. The steam thus generated flows through the demister 711 for shedding moisture, and is condensed on the tube bundle 713 to be freshwater. The remaining brine is blown down to a seawater lake.

The multi-stage flash evaporator shown in FIG. 8 comprises two flash chambers 710 serially connected to each other, through which seawater pumped up by the pump 411 flows sequentially. Also the steam after the condensation at the tube bundle 713 and the brine after the flashing sequentially flow through the two flashing chambers 710.

The multi-stage flash evaporator has many advantages compared with the single stage flash evaporator as follows:

(1) Thermal efficiency can be increased easily.

(2) Control of scale on the heating surface is easy because no evaporation takes place on the heating surface in the brine heater.

(3) Low pressure steam can be used for evaporation.

(4) Distillate capacity and product ratio can be easily selected.

Incidentally, although the power source is formed of solar cells in the above embodiment, other type of solar energy exchange system for exchanging the solar energy to electric power or thermal energy such as solar thermal power generating system may be used. Alternatively, a nuclear power plant may be used as at least a part of power sources and heat sources.

According to the present invention, a water system is formed in an inland area in a comparatively short time because seawater is pumped up by a pump facility and an artificial seawater lake is formed of the seawater. Since freshwater is produced with the seawater of the artificial seawater lake, freshwater can be supplied to a projected irrigation area at an early stage of the construction of the irrigation system.

When a part of coolant flowing out of a heat exchange pipes in the freshwater producing plant is returned to a vaporization vessel while the rest of the coolant is supplied to the artificial seawater lake in the freshwater producing plant shown in FIG. 2, the thermal energy generated by the heater is used in heating the seawater in the vaporization vessel and in warming the artificial seawater lake. The rise of the lake temperature promotes vaporization in the lake to increase the total amount of freshwater in that area; thus the energy generated by the heater is efficiently used in producing freshwater.

A solar energy power generation plant as a power source precludes the necessity of other types of energy resources such as petroleum. The sprinkler facility for cleaning the solar cell surfaces of the solar-cell power generating plant provides an advantage of preventing the reduction of efficiency of solar cells.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An irrigation system, comprising:
a pump facility for pumping seawater from a sea;
an artificial seawater lake formed in an inland area for storing said seawater pumped up by said pump facility, said stored seawater being exposed to sun and wind to partially evaporate and to thereby increase local atmospheric humidity;
a freshwater producing facility for pumping up said stored seawater from said artificial seawater lake and for producing freshwater from said seawater, said freshwater producing facility being located closer to a projected irrigation area than is said artificial seawater lake, the location of said freshwater producing facility being selected to enable convenient storage of salt produced by extraction of fresh water from seawater processed thereat; and
a freshwater supply facility for supplying said freshwater produced by said freshwater producing facility to said projected irrigation area.

2. An irrigation system in accordance with claim 1, further comprising:
a freshwater storage facility for storing said freshwater produced by said freshwater producing facility, comprising
vaporization means for vaporizing said seawater,
condensation means connected to said vaporization means for condensing water vapor produced by said vaporizing means;
heat exchange piping provided in said condensation means for cooling said water vapor to condense said freshwater therefrom;

a coolant supply device for supplying said seawater from aid artificial seawater lake into said heat exchange piping to serve as a coolant therein;

a freshwater supply device for supplying said freshwater from said condensation means to said freshwater storage facility; and seawater distribution means for supplying a first portion of said seawater flowing out from said heat exchange piping to said vaporization means and for supplying a second portion of said seawater coolant to said artificial seawater lake.

3. An irrigation system in accordance with claim 2, further comprising:

a solar-cell power generation plant having a plurality of solar cells for supplying electric power to said pump facility, said freshwater producing facility, and said freshwater supply facility, wherein said solar-cell power generation plant comprises a sprinkler facility for sprinkling freshwater on surfaces of said solar cells to clean said surfaces.

4. An irrigation system in accordance with claim 3, further comprising:

an open canal network, comprising a plurality of canals presenting significant seawater surfaces exposed to sun and wind to promote evaporation to enhance ambient humidity, as a part of transportation means of said seawater between said pump facility and said artificial seawater lake, where sides and bottom of said open canals are made of watertight material.

5. An irrigation system in accordance with claim 4, further comprising:

an artificial freshwater lake for storing said freshwater produced in said freshwater producing facility, wherein said freshwater supply facility supplies said stored freshwater from said artificial freshwater lake to said projected irrigation area.

6. An irrigation method, comprising the steps of:

(a) constructing a pump facility for pumping seawater from an a sea;

(B) forming an artificial seawater lake in inland area for storing said seawater pumped by said pump facility so that said stored seawater is exposed to sun and wind to partially evaporate to increase local atmospheric humidity;

(c) constructing a freshwater producing facility for pumping said seawater from said artificial seawater lake and for producing freshwater from said seawater, said freshwater producing facility being located closer to a projected irrigation area than is said artificial seawater lake, the location of said freshwater producing facility being selected to enable convenient storage of salt produced by extraction of freshwater from seawater processed thereat; and (d) constructing a freshwater supply facility for supplying said freshwater produced by said freshwater producing facility to said projected irrigation area.

7. An irrigation method in accordance with claim 6, wherein:

said step (b) comprises a step of constructing a seawater spray facility for spraying said seawater on a projected artificial-seawater-lake area to facilitate said vaporization of said seawater.

8. An irrigation method in accordance with claim 7, wherein:

said step (a) comprises a step of constructing a solar-cell power generation plant having a plurality of solar cells for supplying electric power to said pump facility, said freshwater producing facility, and said freshwater supply facility, wherein said solar-cell power generation plant comprises a sprinkler facility for sprinkling freshwater on surfaces of said solar cells to clean said surfaces.

9. An irrigation method in accordance with claim 8, wherein:

said step (b) further comprises a step of constructing transportation means for transporting said seawater between said pump facility and said artificial seawater lake, said transportation means comprising an open canal with sides and bottom made of a watertight material.

10. An irrigation method in accordance with claim 9, wherein:

said step (d) comprises a step of forming an artificial freshwater lake for storing said freshwater produced in said freshwater producing facility, and said freshwater supply facility supplies said freshwater from said artificial freshwater lake to said projected irrigation area.

* * * * *